US011608730B2

(12) United States Patent
Valiveti et al.

(10) Patent No.: US 11,608,730 B2
(45) Date of Patent: Mar. 21, 2023

(54) GRID MODIFICATION DURING SIMULATED FRACTURE PROPAGATION

(71) Applicant: ExxonMobil Upstream Research Company, Spring, TX (US)

(72) Inventors: Dakshina M. Valiveti, The Woodlands, TX (US); Chandrasekhar A. Srinivas, Tamil Nadu (IN); Vadim Dyadechko, The Woodlands, TX (US)

(73) Assignee: ExxonMobil Technology and Engineering Company, Spring, TX (US)

(*) Notice: Subject to any disclaimer, the term of this patent is extended or adjusted under 35 U.S.C. 154(b) by 344 days.

(21) Appl. No.: 16/947,901

(22) Filed: Aug. 24, 2020

(65) Prior Publication Data

US 2021/0079779 A1 Mar. 18, 2021

Related U.S. Application Data

(60) Provisional application No. 62/901,485, filed on Sep. 17, 2019.

(51) Int. Cl.
*E21B 44/00* (2006.01)
*G06T 17/20* (2006.01)
*G01V 1/28* (2006.01)
*E21B 43/26* (2006.01)

(52) U.S. Cl.
CPC .............. *E21B 44/00* (2013.01); *E21B 43/26* (2013.01); *G01V 1/282* (2013.01); *G06T 17/20* (2013.01)

(58) Field of Classification Search
CPC ...... E21B 44/00; E21B 43/26; E21B 2200/20; E21B 43/2605; E21B 43/2607; E21B 43/27; E21B 33/00; G01V 1/282; G01V 2210/641; G01V 2210/646; G01V 1/302;
(Continued)

(56) References Cited

U.S. PATENT DOCUMENTS 8,204,727 B2 6/2012 Dean et al.
8,762,118 B2 6/2014 Nasreldin et al.
(Continued)

FOREIGN PATENT DOCUMENTS

WO 2019038212 A1 2/2019

*Primary Examiner* — Rehana Perveen
*Assistant Examiner* — Troy A Maust
(74) *Attorney, Agent, or Firm* — ExxonMobil Technology and Engineering Company—Law Department (57) ABSTRACT

Geologic modeling methods and systems disclosed herein employ an improved simulation gridding technique that optimizes simulation efficiency by balancing the computational burdens associated with remeshing against the performance benefits of doing so. One method embodiment includes: (a) obtaining a geologic model representing a subsurface region as a mesh of cells, at least some of the cells in the mesh having one or more interfaces representing boundaries of subsurface structures including at least one fracture; (b) determining a fracture extension to the at least one fracture; (c) evaluating whether the fracture extension is collocated with, or is proximate to, an existing cell interface, and using the existing cell interface if appropriate or creating a new cell interface if not; and (d) outputting the updated version of the geologic model.

19 Claims, 5 Drawing Sheets

(58) Field of Classification Search
CPC ..... G01V 99/005; G06T 17/20; G06T 17/205; G06T 17/05
USPC .......................................................... 703/10
See application file for complete search history.

(56) References Cited

U.S. PATENT DOCUMENTS

| | | | |
|---|---|---|---|
| 2013/0332129 A1* | 12/2013 | Xia | E21B 43/16 703/9 |
| 2017/0059742 A1* | 3/2017 | Mookanahallipatna Ramasesha | E21B 43/26 |
| 2018/0094514 A1 | 4/2018 | Leem et al. | |
| 2018/0245435 A1 | 8/2018 | Becker et al. | |
| 2018/0274337 A1* | 9/2018 | Freno | E21B 49/00 |
| 2021/0256183 A1* | 8/2021 | Zhang | G01V 99/005 |

* cited by examiner

GRID MODIFICATION DURING SIMULATED FRACTURE PROPAGATION

CROSS REFERENCE TO RELATED APPLICATION

This application claims the benefit of U.S. Provisional Application No. 62/901,485 titled "Grid Modification During Simulated Fracture Propagation", filed on Sep. 17, 2019, the disclosure of which is incorporated herein by reference in its entirety.

TECHNICAL FIELD

The present application relates generally to the field of hydrocarbon exploration and production and, more particularly, to geologic modeling. Specifically, the disclosure relates to a method for determining, in a subsurface model, propagation behavior of a fracture network. The propagation behavior may be used for evaluating strategies to develop a reservoir and to extract hydrocarbons.

BACKGROUND

A geologic model is a computer-based three-dimensional ("3D") representation of a region beneath the earth's surface. Such models can be used to model a petroleum reservoir, a depositional basin, or other regions which may have valuable mineral resources. Once the model is constructed, it can be used for various purposes, many of which are intended to facilitate efficient and economical recovery of the valuable resources. For example, the geologic model may be used as an input to simulations of petroleum reservoir fluid flows during production operations, which are used to plan well placements and predict hydrocarbon production from a petroleum reservoir over time.

When performing reservoir simulations, geologic models are typically divided into a grid or mesh of volumetric cells, i.e., volumetric elements having material properties values that are constant (or otherwise well-defined) within each cell. (The terms "grid" and "mesh" are used interchangeably herein.) There is a tradeoff between the number and size of volumetric elements, with more numerous smaller elements typically providing higher accuracies at the cost of higher computational demands A gridding strategy is considered desirable if it minimizes the computational burden for a given level of accuracy, without requiring an inordinate time to complete the gridding process. Various gridding strategies are known, but continuing improvements are sought, particularly with respect to modeling the behavior of fracture networks.

Unconventional reservoirs often have a low-permeability rock matrix that impedes fluid flow, making it difficult to extract hydrocarbons (or other fluids of interest) at commercially feasible rates and volumes. However, the effective permeability of the formation can be increased by hydraulic fracturing. When the rock matrix is exposed to a high-pressure high-volume flow of a relatively incompressible fluid, the low permeability causes sharp gradients in the formation's stress field, forcing integrity failures at the relatively weakest points of the rock matrix. Such failures often occur as sudden "cracking" or fracturing of the matrix that momentarily reduces the stress gradient until it can be rebuilt by the intruding fluid flow. As the high-pressure flow continues, the fractures may propagate, for example, as an intermittent series of small cracks. The injected fluid also deforms and shifts blocks of matrix material, further complicating the fracture propagation analysis.

Oilfield operators generally desire to provide a relatively even distribution of fractures throughout the reservoir while avoiding overlap in the fractures connecting to different wells or different production zones in a single well. (Such overlaps or uneven distributions can dramatically reduce the rate and efficiency at which fluid can be drained from that region.) To achieve the desired distribution, operators seek to induce fracturing with carefully controlled fracture reach ("extent"). Inaccuracies in predicting and controlling fracture extent significantly impair the efficiency and rate at which fluids can be recovered from the formation. The complexity of underlying physics, the uncertainty involved with subsurface flow and mechanical properties result in significant emphasis on numerical modeling and simulation for such processes. Unfortunately, only limited computational resources are available for modeling hydraulic fracture propagation and the formation of the fracture network, making it desirable to maximize the efficiency of the simulation process.

U.S. Pat. No. 8,204,727 describes methods for modeling a geomechanical reservoir system to provide fracturing predictions. In U.S. Pat. No. 8,204,727, a two-dimensional ("2D") grid is used for computations of the fracture flow model and a 3D grid is used for computations of other models, such as a reservoir model. The 3D model may use a structured or unstructured hexahedral grid and the 2D grid may use structured or unstructured quadrilateral grid that shares nodes with the 3D grid. However, in U.S. Pat. No. 8,204,707, fracture propagation appears to be limited to boundaries between pre-existing hexahedral grid cells.

U.S. Pat. No. 8,762,118 describes a method for modeling hydraulic fractures of a well, whereby a processor is used to generate a geomechanical model of a reservoir, simulate hydraulic fractures, and map the simulated hydraulic fractures onto a reservoir model. In U.S. Pat. No. 8,762,118, a three dimensional volume of the hydraulic fracture is built starting from the well for each grid cell in the reservoir model on a cell-by-cell basis using stress directions found in the geomechanical model. However, the reference does not provide any description or detail regarding a gridding strategy for the fracture.

U.S. Patent Application Publication No. 2013/0332129 describes a hydraulic fracture simulation method that superposes "phantom" nodes over "real" nodes to avoid requiring "the mesh to match the geometry of the discontinuities". The phantom nodes provide "pore pressure and rock displacement degrees of freedom" for modeling fluid flow, and are allowed to separate from their corresponding real nodes in a fashion that depends on the cohesion of the fracture.

U.S. Patent Application Publication No. 2017/0059742 describes the use of a numerical mesh in a model of a porous medium to simulate propagation of cracks during a hydraulic fracturing operation. The method employs "zero-thickness interface elements which are inserted along pre-defined fracture planes" and extended "along finite element boundaries along which new fractures may propagate". Thus, in U.S. Patent Application Publication No. 2017/0059742 the fracture propagation is restricted to edges or faces with an existing mesh.

U.S. Patent Application Publication No. 2018/0094514 describes the use of software applications to model hydraulic fracturing operations based in part on stress anisotropy. However, the reference fails to provide any description or detail with regard to a gridding strategy for the model.

U.S. Patent Application Publication No. 2018/0274337 describes a hydraulic fracture simulation method that includes "displacing a subset of mesh nodes into alignment with the fracture path" and deriving a deformed mesh that includes the displaced mesh nodes.

U.S. Patent Application No. 2018/0245435 describes modifying a background mesh that fails to honor at least one subsurface feature by splitting the mesh along the feature to produce a mesh that honors the geometry of that subsurface feature.

WO 2019/038212 describes the use of separate meshes, which may or may not use shared node locations, to model the mechanical properties of the formation and the fluid flow properties of the fractures. The publication suggests that the geomechanical model may be discretized "by adaptive meshes taking into account the geological structures represented by the geomechanical model", and that the fluid flow model may be discretized "by adaptive meshes taking into account the sharpness of natural fractures or the flow conditions such as boundary layers". Coupling between the models is used to determine "deformation of the geologic material". However, the publication does not provide any particular gridding strategy beyond these general statements.

While the prior references provide various methods to model hydraulic fracturing operations, each of the foregoing references may lack enabling detail for their gridding strategy or may fail to balance the tradeoff between number and size of volumetric elements in a fashion that suitably optimizes simulation efficiency. Thus, it would be desirable to have a computationally efficient method to model fracture propagation and hydraulic fracturing treatments.

SUMMARY

Accordingly, there are disclosed herein geologic modeling methods and systems employing an improved simulation technique that optimizes simulation efficiency by balancing the computational burdens associated with remeshing against the performance benefits of doing so. One illustrative geologic modeling method embodiment includes: (a) obtaining a geologic model representing a subsurface region as a mesh of cells, at least some of the cells in the mesh having one or more interfaces representing boundaries of subsurface structures including at least one fracture; (b) determining a fracture extension to the at least one fracture; (c) evaluating whether the fracture extension is collocated with, or is proximate to, an existing cell interface, and: (i) if collocated, using the existing cell interface to represent part of the at least one fracture in an updated version of the geologic model; (ii) if proximate, displacing the existing cell interface to represent part of the at least one fracture in the updated version of the geologic model; and (iii) if neither collocated nor proximate, splitting a cell to create a new cell interface that represents part of the at least one fracture in the updated version of the geologic model; and (d) outputting the updated version of the geologic model.

One illustrative geologic modeling system embodiment includes: a memory having geologic modeling software; and one or more processors coupled to the memory to execute the geologic modeling software. The software causes the one or more processors to perform operations that implement the geologic modeling method above.

One illustrative geologic modeling product embodiment includes a non-transitory information storage medium having computer readable program code embodied therein. When executed, the program code configures a computer to implement the geologic modeling method above.

The foregoing embodiments may be employed individually or conjointly, and they may further employ one or more of the following optional features in any suitable combination: 1. Storing the updated version of the geologic model on a non-transitory information storage device. 2. Displaying a visual representation of the updated version of the geologic model. 3. Employing the updated version of the geologic model to evaluate a well placement strategy. 4. Said determining includes: employing the geologic model to construct a set of equations representing fluid flow, proppant transport, and rock physics within the subsurface region; and numerically solving the set of equations to obtain the fracture extension along with rock stresses, rock pore pressure, fracture pressure, fracture opening, and proppant concentration. 5. The set of equations further provide a solution for fluid injection and proppant transport associated with a hydraulic fracturing operation. 6. The existing cell interface or the new cell interface is defined by mesh nodes, and said mesh nodes include degrees of freedom for representing characteristics of the fracture extension. 7. The characteristics include: spatial displacements between the fracture's sides, fluid pressure, proppant concentration, and transverse flow or transmissibility within the fracture. 8. The fracture or fracture extension is represented without node splitting. 9. The fracture extension is determined to be located with an existing cell interface if an angle between the fracture extension and the existing cell interface is below a predetermined threshold and/or if the fracture extension intersects the existing cell interface. 10. The fracture extension is determined to be proximate to an existing cell interface if the angle is between the predetermined threshold and a second predetermined threshold. 11. The fracture extension is determined to be neither collocated nor proximate based at least in part on a stability measure in the set consisting of: a cell aspect ratio, cell skewness, cell convexity, a finite element Jacobian, and a global assembly matrix condition number.

DETAILED DESCRIPTION

It should be understood that the drawings and following description do not limit the disclosure, but on the contrary, they provide the foundation for understanding all modifications, equivalents, and alternatives falling within the scope of the appended claims.

Figure 1A:
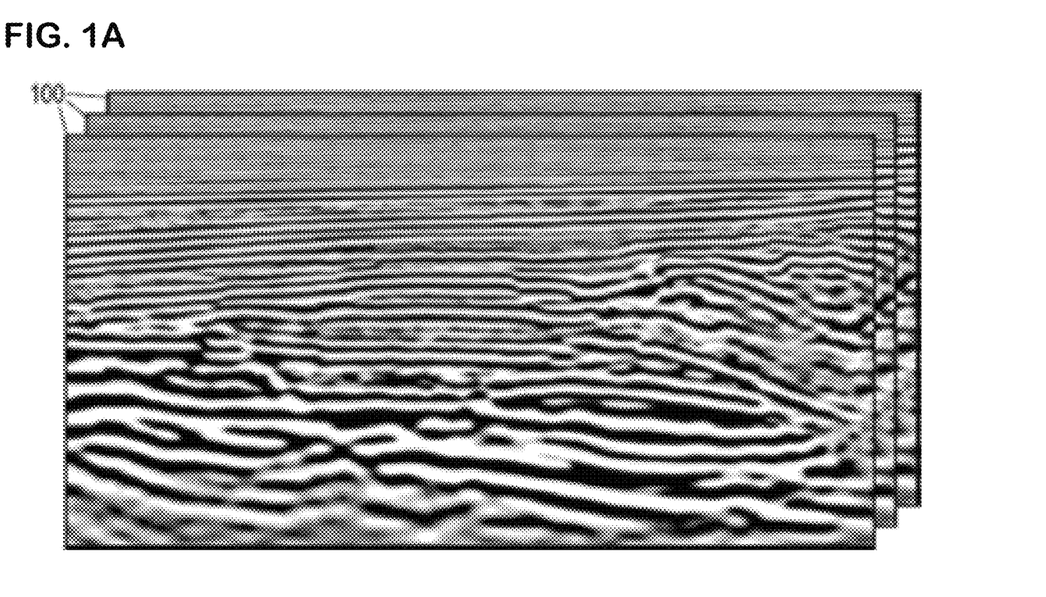
FIG. 1A shows an illustrative measured seismic image volume.

Turning now to the figures, FIG. 1A shows an illustrative measured seismic image volume 100, which can be expressed in many ways but is here shown as parallel slices of a three-dimensional volume. The measured image volume 100 is typically obtained by processing of field-recorded seismic survey traces representing seismic wave responses to shots or other sources of seismic energy triggered at various shot locations. The processing corrects for seismic wave travel times to determine reflective interface locations, and combines repeated measurements at each location to increase the signal to noise ratio. While seismic reflectivity is commonly employed, other seismic wave properties can also or alternatively be derived from the traces and used to construct the measured seismic image volume. One particular transformation is the inversion of the seismic data to estimate petrophysical parameters such as porosity, clay volume fraction, etc. that are often part the geological model.

Figure 1B:
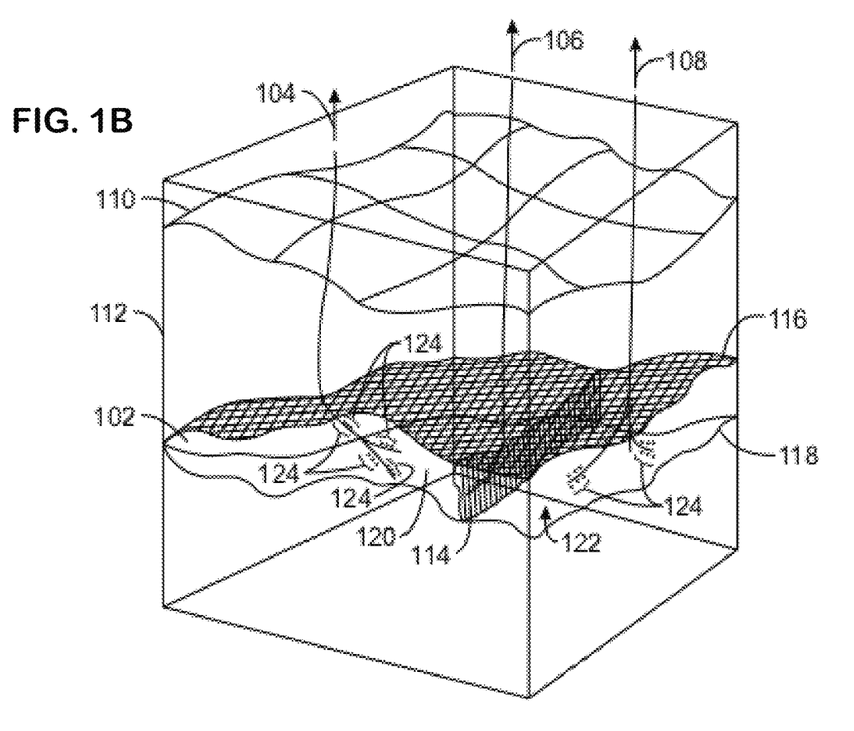
FIG. 1B shows an illustrative subsurface model.

FIG. 1B shows an illustrative subsurface model having features that may be derived from a seismic image volume. The illustrative model includes a number of surfaces defining the boundaries of a potentially hydrocarbon-bearing formation 102 that may serve as a reservoir of oil or natural gas. The model facilitates placement and drilling of wells 104, 106, 108, from the Earth's surface 110 through layers of overburden 112 to access the formation 102. The illustrative model surfaces may include faults 114 and horizons 116, 118. The surfaces may intersect in a fashion that divides the reservoir formation 102 into distinct compartments 120, 122. The petrophysical parameters of each compartment may be estimated based on the seismic image data and/or measured using logging instruments in exploratory wells.

Modern drilling techniques enable the wells 104, 106, 108 to deviate from the vertical orientation and to be directionally drilled to follow the reservoir 102. Further, the wells can be branched to increase the amount of wellbore contact with the reservoir, as shown for wells 104 and 108. The wells 104, 106, and 108, can have numerous areas with perforations 124, indicated as dots next to the wells, to provide a flow path for fluids, such as hydrocarbons, from the reservoir 102 into the wells 104, 106, and 108 for removal to the surface. Wells 104, 106, and 108 depict very long horizontal sections that maintain contact with the reservoir in an unconventional play. If properly employed, such techniques may enable faster and more efficient extraction of reservoir fluids.

The locations and paths for the wells 104, 106, and 108, and the location of the perforations 124, may be optimized performing reservoir fluid flow simulations based on the subsurface model. Subsurface models are often used as inputs to reservoir simulation programs that predict the behavior of fluids contained therein and may also predict the behavior of rocks under various scenarios of hydrocarbon recovery. Miscalculations or mistakes can be costly. For example, miscalculations may result in suboptimal locations for the wells 104, 106, and 108, potentially lacking any contact with the reservoir formation. The additional expense associated with correcting or compensating for the suboptimal well locations would typically exceed a million dollars. Subsurface model based planning and simulation provide a mechanism to identify which recovery options offer more economic, efficient, and effective development plans for a particular reservoir.

More specifically, subsurface model construction begins with extraction of surfaces from a seismic image volume, including faults, horizons, and defining any additional surfaces such as boundaries for the region of interest. The different surfaces may be adjusted and trimmed to define closed "watertight" volumes often called zones, compartments, or containers, such as zones 120 and 122. The zones of interest are those rock formations (e.g., shale, coal, sandstone, granite) that contains hydrocarbons or other resources such as, e.g., oil or natural gas. The rock formations may or may not be naturally fractured. When the zones include tight gas formations (i.e., natural gas trapped in low permeability rock such as shale), it is typically desirable to create additional fractures in the formation to increase the formation's effective permeability.

Hydraulic fracturing operations employ an injection assembly coupled to supply a high-pressure, high-volume fluid flow via the wellbore to a perforated region, where the flow exits and enters the formation around the well. The fluid flow opens existing fractures and creates new fractures. Sand grains or other "proppants" are carried by the fluid into the open fractures to prevent the fractures from reclosing when the injection process is finished. The fracture treatment may employ a single injection of fluid to one or more fluid injection locations, or it may employ multiple such injections, optionally with different fluids. Where multiple fluid injection locations are employed, they can be stimulated concurrently or in stages. Moreover, they need not be located within the same wellbore, but may for example be distributed across multiple wells or multiple laterals within a well.

An injection treatment control subsystem coordinates operation of the injection assembly components (pump trucks, feed tanks, throttles, valves, flow sensors, pressure sensors, etc.) to monitor and control the fracture treatment. The control system may be localized to a single instrument truck, or it may take the form of multiple data acquisition and processing subsystems, communication equipment, and other equipment for monitoring and controlling injection treatments applied to the subterranean region through the wellbore. The injection treatment control subsystem may be communicably linked to a remote computing facility that can calculate, select, or optimize treatment parameters for initiating, opening, and propagating fractures of the desired extent. The injection treatment control subsystem may receive, generate or modify an injection treatment plan (e.g., a pumping schedule) that specifies properties of an injection treatment to be applied to the subterranean region. Based on such modeled behavior results, the injection treatment control subsystem can control operation of the injection assembly.

The processing subsystems may include any of various types of devices, including, but not limited to, handheld mobile devices, tablets, notebooks, laptops, desktop computers, workstations, mainframes, distributed computing networks, and virtual (cloud) computing systems; these execute software that models the opening and propagation of fractures in the target zone. Hydraulic fracturing operations produce complex fracture networks that pose steep requirements for computational modeling of physical phenomena (such as crack propagation and fluid-structure interactions) to the desired accuracy. For such modeling, it is preferred to have the surface-based model representation gridded into a volumetric mesh in which each cell ("voxel") has homogenous or otherwise well-defined mechanical and fluid material properties and potentially has a defined fluid transmissibility to each neighboring cell with which it shares a cell face.

One of the challenges associated with developing computational models is the conversion from the surface-based model to the volumetric mesh. One approach disclosed in the prior art is to model the domain of the fracture network using a pre-determined mesh. The cells of the mesh correspond to the rock, while the edges (for 2D) or faces (for 3D)

correspond to the (potential) fractures. As aspects of the fluid mechanics are simulated in the presence of a rock stress distribution, fractures are initiated, opened, and/or extended along the predefined static edges or faces of the mesh. The mesh is static, meaning that the potential fracture locations and orientations remain fixed. In other words, the simulation software inherently constrains the directions and rates of fracture propagation. Perhaps unsurprisingly, the initial mesh choice strongly influences the fracture propagation trajectory, oftentimes in a fashion that is unlikely to be representative of the physical system. For propagation along a general direction not aligned with the mesh edges, the static mesh must be especially fine to capture the fracture path with the required accuracy, substantially increasing the number of unknowns in the simulated domain and hence greatly increasing the computational requirements.

Figure 2:
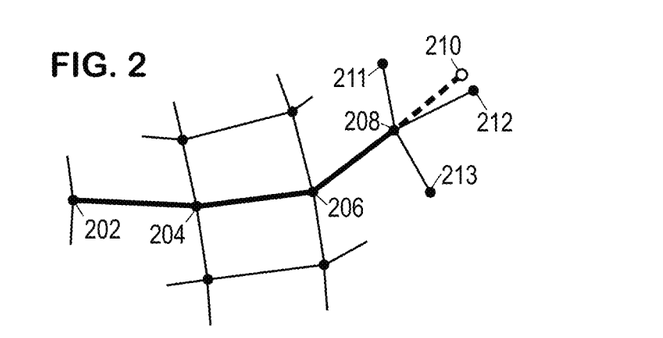
FIG. 2 shows identified features in an illustrative 2D model.

This challenge may be resolved through the use of a dynamic, deformable mesh. FIG. 2 shows a portion of a deformable mesh representing a fracture in the form of edges between a sequence of nodes 202, 204, 206, 208. As the fracture propagates, edges and nodes are added sequentially at a distance and direction that are determined by the governing physics equations rather than the mesh. Thus, for example, if the equations indicate that the illustrated fracture should propagate from node 208 to a new node at position 210 over a given period of time, the mesh may be deformed to locate one of the connected nodes 211, 212, or 213 at position 210.

In principle, this deformable mesh approach enables fractures to be represented along cell faces without limiting the fracture orientations. However, one benefit of the pre-defined mesh is the computational efficiencies that can be gained due to the mesh's regular structure (i.e., relative volume uniformity and spatial distribution of cells, and sparsity of interfaces with other cells, each of which enable efficiently structured storage of the volumetric model data in memory). It is desirable to preserve this regular structure as much as possible while still enabling fractures to be represented along cell faces. This preservation is particularly desirable when modeling fracture propagation, as repeated changes to the structure of the stored model data will either necessitate shifting substantial amounts of data within memory, altering the data access patterns in an efficiency-reducing fashion, or some combination of the two.

Figure 7A:
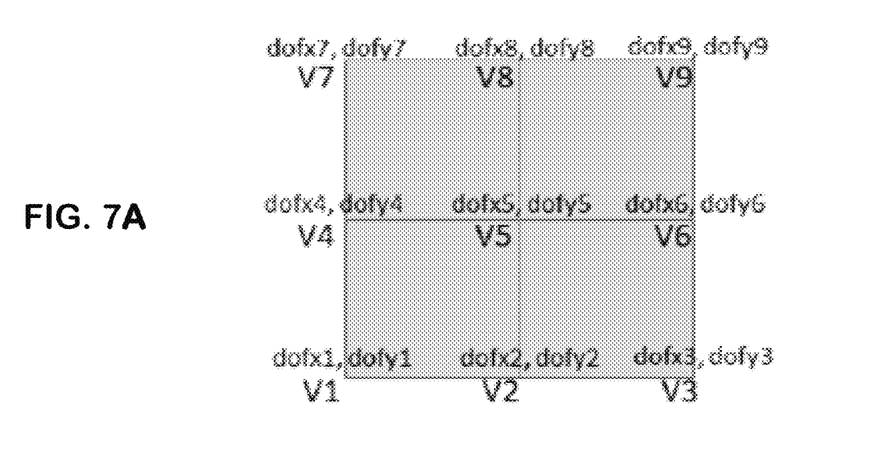
FIG. 7A shows vertices in an illustrative 2D model.
Figure 7B:
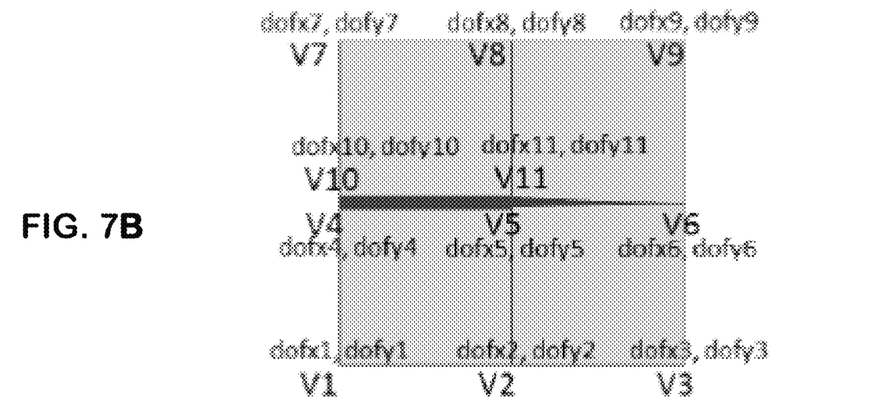
FIG. 7B illustrates one approach to fracture propagation in the model of FIG. 7A.

To clarify this last point, we turn momentarily to FIGS. 7A and 7B. FIG. 7A shows an illustrative initial mesh representing an unfractured formation. Nine vertices V1-V9, each having x, y coordinates (shown as dofxi, dofyi), are connected by 12 interfaces to define four cells. FIG. 7B shows a conventional approach to introducing a fracture into the formation, whereby new vertices V10 and V11 are added with corresponding coordinates and edge connections representing the fracture opening. However, the storage of (and/or access to) the additional geometrical entities associated with the additional vertices imposes undesirable time and memory burdens to the simulation process.

Figure 7C:
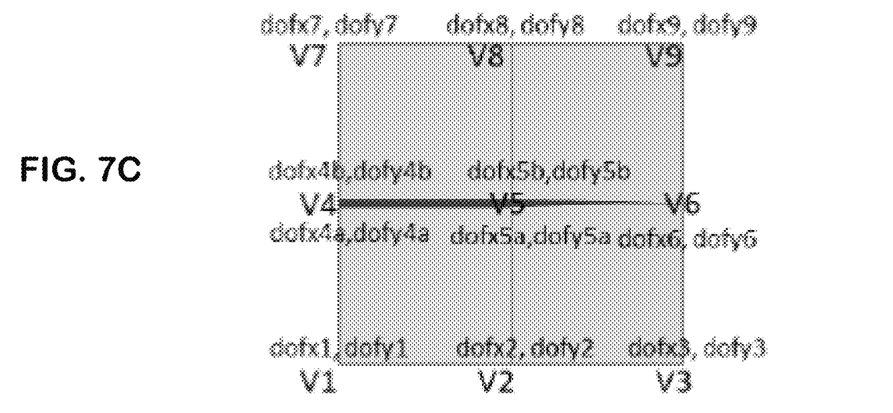
FIG. 7C illustrates a preferred approach to fracture propagation.

In contrast with the approach of FIG. 7B, FIG. 7C shows a preferred approach which minimizes any added computational burdens by adding additional degrees of freedom to existing vertices rather than introducing new vertices, edges, or other such additional geometrical entities. Thus, as seen in FIG. 7C, vertices V4 and V5 each have four associated degrees of freedom (e.g., vertex V4 is associated with dofx4a, dofy4a and dofx4b and dofy4b). Thus, in the example of FIG. 7C, existing vertices V4 and V5 are augmented with x, y coordinates for representing offset between the faces of the fracture and hence the fracture opening.

Accordingly, there is proposed herein a gridding method that (a) accommodates fractures along existing interfaces by introducing additional degrees of freedom without adding geometrical entities, and (b) enables deformation or modification of the pre-determined mesh only under those circumstances where the modeling accuracy improvement is deemed to outweigh the associated loss of computational efficiency.

The pre-determined mesh can be one determined in accordance with any extant gridding strategy, and in particular, may be chosen to align some of the cell boundaries with surfaces in the surface-based model. The gridding process is followed by assignment of petrophysical parameter values to each mesh cell and/or cell surface. Illustrative parameter values include transmissibility or flow rates between cells, rock type, porosity, permeability. Bias modulus, elastic modulus, Poisson ratio, initial stresses, and pressure, rock fracture toughness, failure stress. The transmissibility between cells on the two sides of an existing fault will also be established. Geostatistics may be used in subsurface models to interpolate observed data and to superimpose an expected degree of variability.

Locations of wells and fluid injection zones are then determined for simulating the creation and propagation of fractures. The process of hydraulic fracturing involves fluids pumped down at a prescribed flow rate through the wellbore/casing and into the formation through perforations. When the fluid pressure exceeds the rock breakdown pressure, it creates a fracture in the formation. Proppants, such as sand, are pumped with fracturing fluid to keep the fracture open after release of pumping pressure. Typically a numerical method such as the finite element or finite volume method is employed to solve the governing equations of fluid flow and rock to estimate/predict the effectiveness of a fracturing treatment. The solution to these governing equations also drives the fracture propagation in the rock medium. Numerous methods appear in the literature for simulating fracture propagation under these conditions.

In our proposed approach we model fracture propagation using a combination of three paradigms: (A) propagation along an existing interface; (B) displacement of an existing interface along a desired propagation direction; and (C) creation of a new interface for propagating the fracture. In each case, the fracture (i.e., the discontinuity in the mesh) can then be represented by assigning additional degrees of freedom to the mesh nodes on the interface where the fracture is present. These additional degrees of freedom enable the relevant properties of the discontinuity to be captured without explicitly modifying the underlying grid topology. (Contrast this with the typical approach of topologically splitting the existing cell interface into two child interfaces each representing one side of a fracture surface, requiring elaborate topology change operations for the underlying grid.) The properties represented by the additional degrees of freedom may include spatial displacements between the fracture's sides, fluid pressure, and transverse flow or transmissibility within the fracture.

To illustrate the three paradigms, FIGS. 3A-3F show a sequence of fracture propagation steps within an existing mesh having an initial crack 310. If a cell interface is not available at the desired initial fracture location, the mesh is modified to establish a cell interface at the desired location, and the nodes on that interface are augmented (i.e., assigned the additional degrees of freedom used to represent the discontinuity). As fluid is injected to increase pressure and flow along the fracture, the fracture propagation is driven by the stress field at the tip, propagating based on some criterion such as whether the stress exceeds the critical stress, or whether a stress intensity factor exceeds fracture toughness of the material. Once the criterion supports the fracture to extend, the angle of extension (fracture orientation) is defined by the orientation of principal stresses ahead of the fracture. The extension length may be taken to be the length of the interface between cells, with an iterative re-evaluation to determine whether a subsequent extension is justified and, if so, the appropriate extension angle.

The fracture extension angle may be compared to the angle (and as discussed further below, the position) of existing cell interfaces near the contemplated extension. Based on this comparison, one of the three paradigms may be selected. Paradigm (A) is selected if the fracture extension is essentially collocated with an existing interface. Collocation may be found if the angle between the interface and the extension is below a first threshold (e.g., 5°) and the interface and extension intersect or share at least one node. Paradigm (B) is selected if the fracture extension, though not collocated with an existing interface, is nevertheless proximate to an existing interface. Proximity may be found if the angle between the interface and extension is below a second threshold (e.g., 15°) and a maximum separation between the extension and existing interface does not exceed a limit (e.g., 30% of a unit cell dimension). Paradigm (C) is selected when neither Paradigm (A) or (B) is suitable. Even if the above criteria for Paradigms (A) and (B) are met, Paradigm (C) may be selected for other reasons such as, e.g., the selected paradigms would cause undue distortion of a mesh cell. Undue distortion may be found, for example, if a mesh cell loses its convexity or has an internal angle that becomes undesirably acute.

Figure 3A:
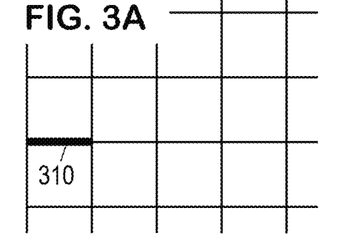
FIGS. 3A-3F show propagation of an illustrative fracture in a 2D model.
Figure 3B:
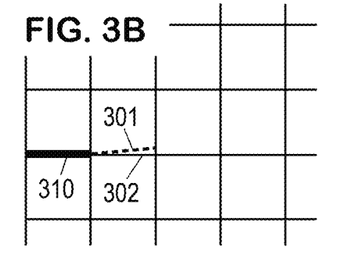
Figure 3C:
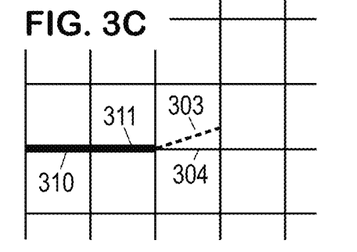

To illustrate, FIG. 3B shows a first extension 301 to fracture 310. Extension 301 is compared to existing cell interface 302, and it is determined that Paradigm (A) applies. Accordingly, FIG. 3C shows the fracture extended along the existing interface 311. FIG. 3C further shows a second extension 303, which is compared to existing cell interface 304. In the illustrated example, it is determined that Paradigm (B) applies, and thus in FIG. 3D a mesh node 313 is shifted to align the existing interface 304 with the second extension 303, yielding a new interface 312.

Figure 3D:
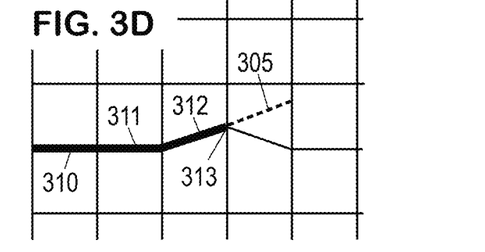

FIG. 3D further shows a third fracture extension 305, extending from node 313 to the far interface of a mesh cell. None of the interfaces for that cell are collocated with, or proximate to, extension 305, so it is determined that Paradigm (C) applies. A mesh node 315 is inserted (or as in the illustrated example, shifted) to define a new interface 314 that splits the previous mesh cell. If the mesh node 315 is sufficiently near an existing mesh node, the existing mesh node may be shifted to the desired position.

Figure 3E:
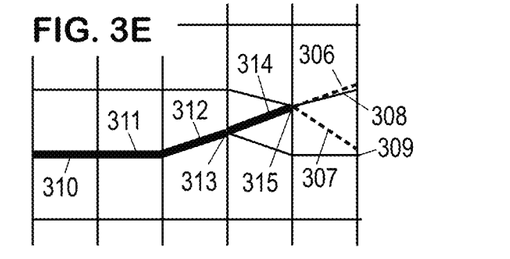
Figure 3F:
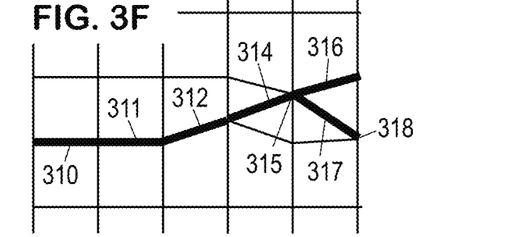

FIG. 3E further shows a fourth extension 306 and a fifth extension 307 branching from the new mesh node 306. Extension 306 is collocated with an existing mesh interface 308, so Paradigm (A) applies and the fracture extension is aligned with the existing mesh interface, yielding new interface 316 as shown in FIG. 3F. Extension 307 is neither collocated with, nor proximate to, any of the interfaces of the relevant mesh cell, so Paradigm (C) applies. A new mesh node 318 is placed to define the new interface 317 splitting the relevant mesh cell. The new mesh node 318 is close to existing mesh node 309, so existing mesh node 309 may be replaced by the new mesh node.

Though Paradigm (C) has been described as splitting a single mesh cell at a time, this may in practice cause difficulties when modeling fracture displacement near a newly-inserted mesh node. Such difficulties may be alleviated by splitting two layers of cells ahead of the existing fracture tip, such that there remains at least one unfractured cell interface ahead of the extended fracture.

Figure 4:
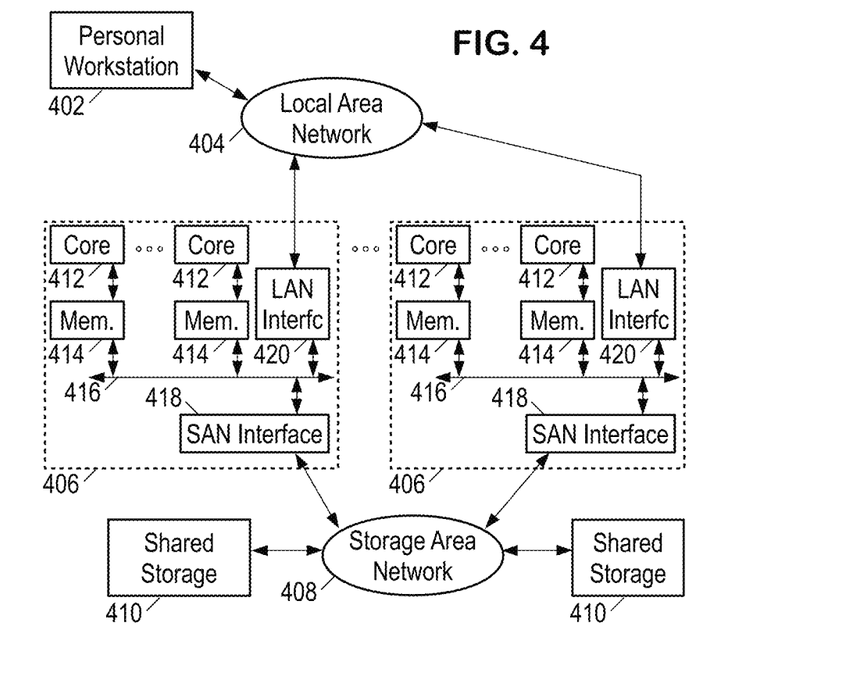
FIG. 4 is a block diagram of an illustrative subsurface modeling system.

To flesh out the certain additional details of the foregoing approach, we now turn to FIG. 4, which is a block diagram of an illustrative subsurface modeling system. The illustrative subsurface modeling system includes a personal workstation 402 coupled via a local area network (LAN) 404 to one or more multi-processor computers 406, which are in turn coupled via a storage area network (SAN) 408 to one or more shared storage units 410. Personal workstation 402 serves as a user interface to the subsurface modeling system, enabling a user to load data into the system, to configure and monitor the operation of the system, and to retrieve the results (often in the form of image data) from the system. Personal workstation 402 may take the form of a desktop computer with a display that graphically shows representations of the input and result data, and with a keyboard that enables the user to move files and execute processing software. LAN 404 provides high-speed communication between multi-processor computers 406 and with personal workstation 402. The LAN 404 may take the form of an Ethernet network.

Multi-processor computer(s) 406 provide parallel processing capability to enable suitably prompt processing of the input data to derive the results data. Each computer 406 includes multiple processors 412, distributed memory 414, an internal bus 416, a SAN interface 418, and a LAN interface 420. Each processor 412 operates on allocated tasks to solve a portion of the overall problem and contribute to at least a portion of the overall results. Associated with each processor 412 is a distributed memory module 414 that stores application software and a working data set for the processors' use. Internal bus 416 provides inter-processor communication and communication to the SAN or LAN networks via the corresponding interfaces 418, 420. Communication between processors in different computers 406 can be provided by LAN 404.

SAN 408 provides high-speed access to shared storage devices 410. The SAN 408 may take the form of, e.g., a Fibrechannel or infiniband network. Shared storage units 410 may be large, stand-alone information storage units that employ magnetic disk media for nonvolatile data storage. To improve data access speed and reliability, the shared storage units 410 may be configured as a redundant disk array ("RAID").

The processors 412 cooperatively execute subsurface modeling software stored in the distributed memory and/or on the shared storage units, which configures to processors to retrieve measurement data and stored model information from the shared storage units 410, operate on the retrieved data and information to implement the modeling methods and improvements disclosed herein, and to store the resulting subsurface models on the shared storage units 410 for future use. Such future use includes visualization methods to convey model information to users, simulation of reservoir fluid movements, and evaluation of well placement, hydraulic fracturing, and production strategies, enabling users to select sites for drillers to direct boreholes, complete wells, and produce reservoir fluids in an efficient manner.

It is the software that configures the various parts of the subsurface modeling system to operate as a hydraulic fracture modeling system. One or more commercially available software packages and libraries may be installed in the computer assembly to provide the functionality for solving linear systems. User-authored programs, functions, scripts, workflows, or other programming mechanisms may be employed to customize the operation of the software and automate certain operations such as those outlined below for formulating reservoir formation models and simulating fracture propagation. The applications software may include a fracture mapping module, mesh fitting module, an equation construction module, an equation solving module, a user interface module, and other function modules, each implemented in the form of machine-readable instructions. Examples of commercially available software that support the use of such programming include C, C++, C++ AMP, D, Erlang, Python and Fortran. The subsurface modeling system can be preprogrammed or can be programmed (and reprogrammed) by loading a program from another source (e.g., from a CD-ROM, from another computer device through a data network, or in another manner). Nevertheless, the implementation of the following methods is not limited to any specific software language or execution environment.

Figure 5:
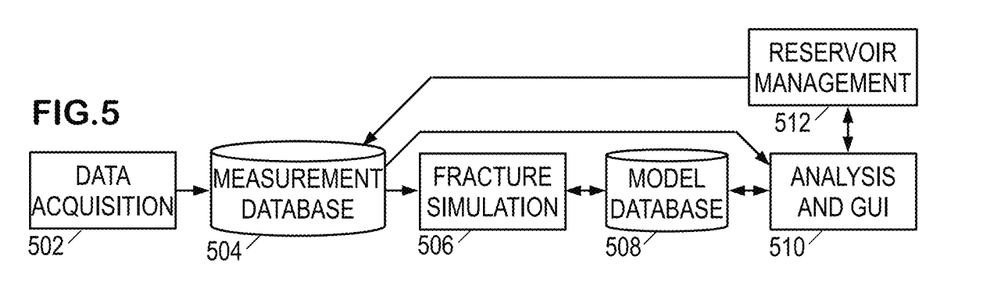
FIG. 5 is a data flow diagram for the illustrative subsurface modeling system.

The software operating on the modeling system may be structured as indicated by the software architecture shown in FIG. 5. A data acquisition module 502 stores various types of data in a measurement database 504. The measurement database may include seismic and well log data relating to hydraulic fracturing plans, as well as template plans with possible parameter ranges for performing hydraulic fracture operations. For example the operations data can indicate a pumping schedule, parameters of previous operations, and parameters of a proposed operation. Such parameters may include information on flow rates, flow volumes, proppant concentrations, fluid compositions, injection locations, injection times, or other parameters.

The measurement database may further include geological data relating to geological properties of a subterranean region. For example, the geological data may include information on wellbores, completions, or information on other attributes of the subterranean region. In some cases, the geological data includes information on the lithology, fluid content, stress profile (e.g., stress anisotropy, maximum and minimum horizontal stresses), pressure profile, spatial extent, natural fracture geometries, or other attributes of one or more rock formations in the subterranean zone. The geological data can include information collected from well logs, rock samples, outcrops, microseismic imaging, tilt measurements, or other data sources.

The measurement database may still further include fluid data relating to well fluids and entrained materials. The fluid data may identify types of fluids, fluid properties, thermodynamic conditions, and other information related to well assembly fluids. The fluid data can include flow models for compressible or incompressible fluid flow. For example, the fluid data can include coefficients for systems of governing equations (e.g., Navier-Stokes equations, advection-diffusion equations, continuity equations, etc.) that represent fluid flow generally or fluid flow under certain types of conditions. In some cases, the governing flow equations define a nonlinear system of equations. The fluid data can include data related to native fluids that naturally reside in a subterranean region, treatment fluids to be injected into the subterranean region, hydraulic fluids that operate well assembly tools, or other fluids that may or may not be related to a well assembly.

Simulation software 506 (including the fracture mapping, mesh fitting, equation construction, and solving modules mentioned above) employs the information from the measurement database 504 to locate and model the propagation of induced fractures. The mesh and fracture properties are stored in model database 508. The mesh and fracture properties may include a mapping of fractures to mesh nodes and augmentation of those nodes with additional degrees of freedom for modeling relevant properties of the fracture. A visualization and analysis module 510 generates visual representations of the fractures and measurements for an operator, generally in an interactive form that enables the operator to enhance portions of the model and derive analytical results therefrom. The visual representation may depict spatial distributions of values and/or integrated values such as injected volumes, flow rates, fracture dimensions, and estimated permeabilities. In some contemplated embodiments, the analysis module further produces recommendations for real-time modifications to treatment plans that are underway. Finally, a reservoir management module 512 may take the results of the guided analysis and capture the selected parameter values for field engineers to use in developing the reservoir. Module 512 may further update the module 510 and measurement database 504 with the parameter values employed and the measured results associated therewith.

Figure 6:
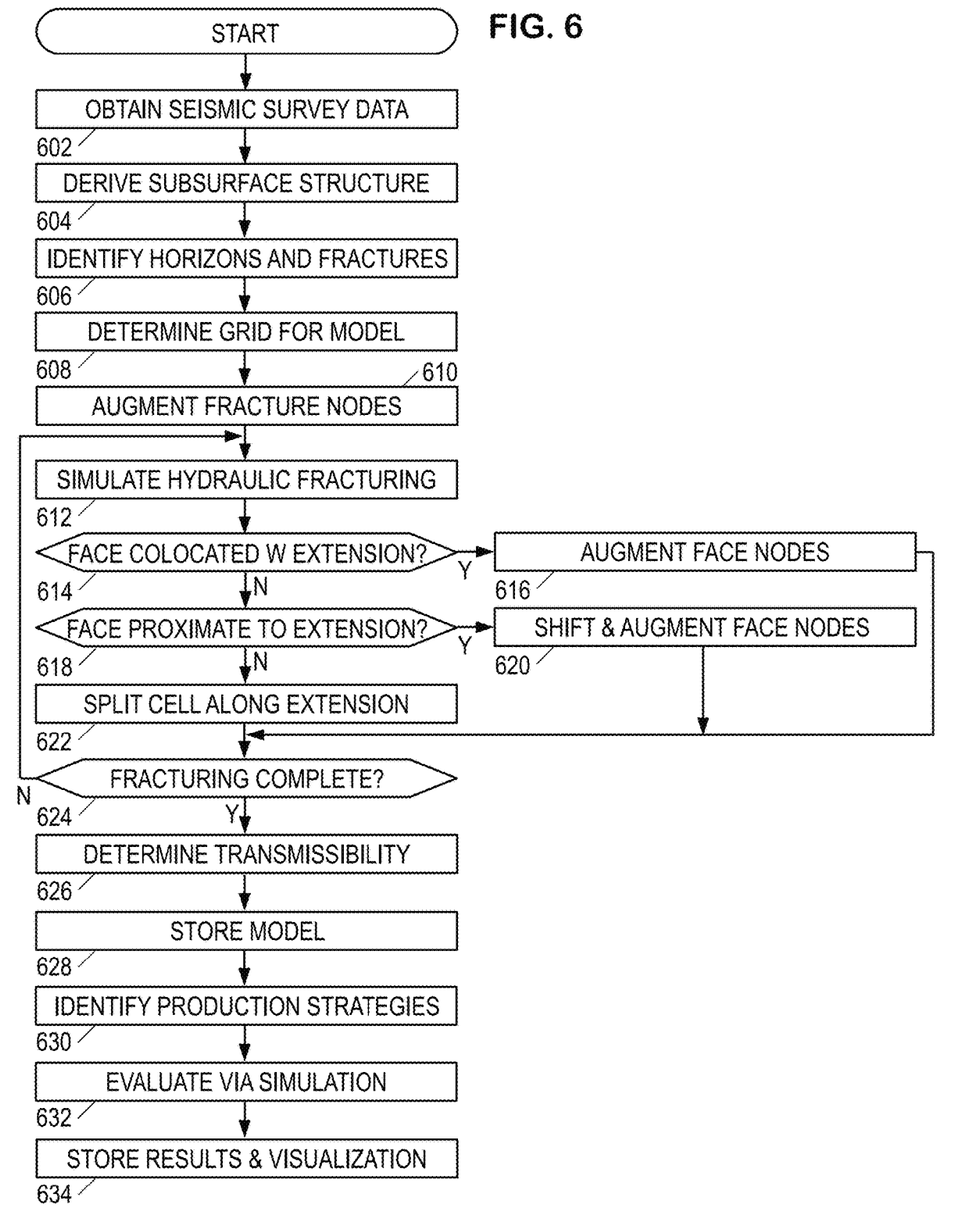
FIG. 6 is a flow diagram of an illustrative subsurface modeling method.

FIG. 6 is a flow diagram of an illustrative subsurface modeling method. It begins in block 602 with the system obtaining seismic survey trace signal data pertaining to a region of interest. In block 604, the system migrates and/or inverts the seismic survey traces to derive at least a high-level picture of the subsurface structure, usually embodied as a volumetric property distribution model in the physical space. In block 606, the physical space model is examined to "interpret" the data, i.e., to identify horizons representing formation boundaries, faults, and any other discernable structures. While this interpretation can be automated to at least some degree, the industry typically employs a geologist or other professional supervise the interpretation process and/or to perform the interpretation manually.

In block 608, the system applies a gridding process to discretize the model at a resolution suitable for simulating the reservoir's response to contemplated production strategies, including well placement and completion (including perforation and fracturing operations). The resulting mesh preferably includes cell boundaries that conform to the boundaries of the identified subsurface structures, including fractures. In block 610, the mesh nodes on the fracture boundaries are augmented with additional degrees of freedom for representing characteristics of the fractures and the fluid flow therein.

In block 612, the system simulates fracture propagation by, e.g., modeling the fluid flow along fractures and into the formation, the resulting alterations of the pressure, deformation, and stress fields, and identifying failure points and probable orientations and lengths of fracture extensions. In block 614, the system determines whether the fracture extension is collocated with an existing interface between cells, and if so, in block 616 the system extends the fracture along the existing interface, augmenting the mesh nodes on the interface with extra degrees of freedom for modeling the relevant characteristics of the fracture extension.

Otherwise, in block 618, the system determines whether the fracture extension is proximate to an existing interface. If so, in block 620 the system shifts the nodes of the existing interface to the desired location of the fracture extension and augments them with the extra degrees of freedom previously discussed.

Otherwise, in block 622, the system splits an existing mesh cell, creating a new interface at the position desired for the fracture extension. As part of the splitting process, existing mesh nodes may be shifted if near enough to the desired position; otherwise new mesh nodes are inserted. The mesh nodes along the fracture extension are then augmented as described previously. The determination of when to align fracture extension along existing interfaces/shift nodes to align with fracture extension/split cells may be user configurable. The user may choose to keep all fracture extensions to pre-existing planes for faster simulation runtime or provide angle thresholds or measures such as cell aspect ratio, skewness, convexity, cell Jacobian computed by Finite Element method and global stiffness matrix condition number to allow the system pick a scheme that is appropriate for each cell extension.

Whether the interface is collocated, proximate, or newly created, the fracture extension process concludes in block 624, where the system determines if propagation is complete. If not, blocks 612-624 are repeated until the situation stabilizes. Once complete, in block 626, the system adjusts the simulation model to account for changes to formation transmissibility or permeability due to the presence of the propagated fractures. In block 628, the system stores the model and simulation mesh to disk or some other form of nontransient information storage medium.

In block 630, the system configures the subsurface model in accordance with an identified production strategy, e.g., by specifying well locations and completion zones. In block 632 the system simulates production from the reservoir to evaluate the identified strategy. Blocks 630 and 632 may be repeated as needed to evaluate different strategies and refinements thereof. In block 634 the system stores at least the results of each simulation, optionally displaying the results and offering an interactive visualization of the model to a user.

The above described approach to deriving a simulation mesh is expected to yield higher-quality results (in terms of simulation accuracy) with lower computational demands than current methods.

Though the operations shown and described in the flow diagram are treated as being sequential for explanatory purposes, in practice the method may be carried out by multiple processors operating concurrently and perhaps even speculatively to enable out-of-order operations. The ordering and sequential treatment is not meant to be limiting. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

Embodiments of the present techniques also relate to an apparatus for performing the operations herein. This apparatus may be specially constructed for the required purposes, or it may comprise a general-purpose computer selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.).

Furthermore, as will be apparent to one of ordinary skill in the relevant art, the modules, features, attributes, methodologies, and other aspects of the present disclosure can be implemented as software, hardware, firmware or any combination of the three. Of course, wherever a component of the present disclosure is implemented as software, the component can be implemented as a standalone program, as part of a larger program, as a plurality of separate programs, as a statically or dynamically linked library, as a kernel loadable module, as a device driver, and/or in any other way known to those of skill in the art of computer programming. The software, hardware, or firmware embodying the disclosed methods may implement machine-readable logic, such that a set of instructions or code residing in memory, when executed, causes one or more processors to employ the other components of a computer system as needed to perform the disclosed methods.

What is claimed is:

1. A geologic modeling method that comprises:
    obtaining a geologic model representing a subsurface region as a mesh of cells, at least some of the cells in the mesh having one or more interfaces representing boundaries of subsurface structures including at least one natural or induced fracture;
    determining a fracture extension to the at least one natural or induced fracture;
    evaluating whether the fracture extension is collocated with, or is proximate to, an existing cell interface, wherein the fracture extension is determined to be collocated with the existing cell interface if an angle between the fracture extension and the existing cell interface is below a predetermined threshold, and:
    if collocated, using the existing cell interface to represent part of the at least one natural or induced fracture in an updated version of the geologic model;
    if proximate, displacing the existing cell interface to represent part of the at least one natural or induced fracture in the updated version of the geologic model; and
    if neither collocated nor proximate, splitting a cell to create a new cell interface that represents part of the at least one natural or induced fracture in the updated version of the geologic model;
    said existing or new cell interface being defined by mesh nodes, and said representing being performed by providing said mesh nodes with additional degrees of freedom enabling fracture separation without requiring extra geometric entities; and
    outputting the updated version of the geologic model.

2. The method of claim 1, wherein said outputting includes:
    storing the updated version of the geologic model on a non-transitory information storage device; and
    displaying a visual representation of the updated version of the geologic model.

3. The method of claim 1, further comprising employing the updated version of the geologic model to evaluate a well placement strategy.

4. The method of claim 1, wherein said determining includes:
    employing the geologic model to construct a set of equations representing fluid flow, proppant transport, and rock physics within the subsurface region; and
    numerically solving the set of equations to obtain the fracture extension along with rock stresses, rock pore pressure, fracture pressure, fracture opening, and proppant concentration.

5. The method of claim 4, wherein the set of equations further provide for fluid injection associated with a hydraulic fracturing operation.

6. The method of claim 1, wherein the additional degrees of freedom include: spatial displacements between the at least one natural or induced fracture's sides, fluid pressure, and transverse flow or transmissibility within the at least one natural or induced fracture.

7. The method of claim 1, wherein the fracture extension is determined to be proximate to an existing cell interface if the angle is between the predetermined threshold and a second predetermined threshold.

8. The method of claim 1, wherein the fracture extension is determined to be neither collocated nor proximate based at least in part on a stability measure in the set consisting of: a cell aspect ratio, cell skewness, cell convexity, a finite element Jacobian, and a global assembly matrix condition number.

9. A geologic modeling system that comprises:
a memory having geologic modeling software; and
one or more processors coupled to the memory to execute the geologic modeling software, the software causing the one or more processors to perform operations including:
obtaining a geologic model representing a subsurface region as a mesh of cells, at least some of the cells in the mesh having one or more interfaces representing boundaries of subsurface structures including at least one natural or induced fracture;
determining a fracture extension to the at least one natural or induced fracture;
evaluating whether the fracture extension is collocated with, or is proximate to, an existing cell interface, wherein the fracture extension is determined to be collocated with the existing cell interface if an angle between the fracture extension and the existing cell interface is below a predetermined threshold, and:
if collocated, using the existing cell interface to represent part of the at least one natural or induced fracture in an updated version of the geologic model;
if proximate, displacing the existing cell interface to represent part of the at least one natural or induced fracture in the updated version of the geologic model; and
if neither collocated nor proximate, splitting a cell to create a new cell interface that represents part of the at least one natural or induced fracture in the updated version of the geologic model;
said existing or new cell interface being defined by mesh nodes, and said representing being performed by providing said mesh nodes with additional degrees of freedom enabling fracture separation without requiring extra geometric entities; and
outputting the updated version of the geologic model.

10. The system of claim 9, wherein said outputting includes:
storing the updated version of the geologic model on a non-transitory information storage device; and
displaying a visual representation of the updated version of the geologic model.

11. The system of claim 9, further comprising employing the updated version of the geologic model to evaluate a well placement strategy.

12. The system of claim 9, wherein said determining includes:
employing the geologic model to construct a set of equations representing fluid flow, rock physics, and proppant transport within the subsurface region; and
numerically solving the set of equations to obtain the fracture extension along with the rock stresses, rock pore pressure, fracture pressure, fracture opening, and proppant concentration.

13. The system of claim 12, wherein the set of equations further provide for fluid injection associated with a hydraulic fracturing operation.

14. The system of claim 9, wherein the additional degrees of freedom include: spatial displacements between the at least one natural or induced fracture's sides, fluid pressure, and transverse flow or transmissibility within the at least one natural or induced fracture.

15. The system of claim 9, wherein the fracture extension is determined to be proximate to an existing cell interface if the angle is between the predetermined threshold and a second predetermined threshold.

16. The system of claim 9, wherein the fracture extension is determined to be neither collocated nor proximate based at least in part on a stability measure in the set consisting of: a cell aspect ratio, cell skewness, cell convexity, a finite element Jacobian, and a global assembly matrix condition number.

17. A non-transitory information storage product having computer readable program code embodied therein, which when executed configures a computer to implement a geologic modeling method that comprises:
obtaining a geologic model representing a subsurface region as a mesh of cells, at least some of the cells in the mesh having one or more interfaces representing boundaries of subsurface structures including at least one natural or induced fracture;
determining a fracture extension to the at least one natural or induced fracture;
evaluating whether the fracture extension is collocated with, or is proximate to, an existing cell interface, wherein the fracture extension is determined to be collocated with the existing cell interface if an angle between the fracture extension and the existing cell interface is below a predetermined threshold, and:
if collocated, using the existing cell interface to represent part of the at least one natural or induced fracture in an updated version of the geologic model;
if proximate, displacing the existing cell interface to represent part of the at least one natural or induced fracture in the updated version of the geologic model; and
if neither collocated nor proximate, splitting a cell to create a new cell interface that represents part of the at least one natural or induced fracture in the updated version of the geologic model;
said existing or new cell interface being defined by mesh nodes, and said representing being performed by providing said mesh nodes with additional degrees of freedom enabling fracture separation without requiring extra geometric entities; and
outputting the updated version of the geologic model.

18. The product of claim 17, wherein the fracture extension is determined to be proximate to an existing cell interface if the angle is below a second predetermined threshold and a maximum separation between the fracture extension and the existing cell interface does not exceed a predetermined limit.

19. The product of claim 17, wherein the fracture extension is determined to be neither collocated nor proximate based at least in part on a stability measure in the set consisting of: a cell aspect ratio, cell skewness, cell convexity, a finite element Jacobian, and a global assembly matrix condition number.

* * * * *